US008447818B2

(12) United States Patent
Balani et al.

(10) Patent No.: US 8,447,818 B2
(45) Date of Patent: May 21, 2013

(54) PARTIALLY AND COMPLETELY DUPLICATIVE MESSAGES HANDLING

(75) Inventors: Naveen Balani, Bangalore (IN); Sowmya H. Dayananda, Bangalore (IN); Rahul Gupta, Bangalore (IN); Vijay R. Kalangumvathakkal, Bangalore (IN); Amrutha S. Shenoy, Bangalore (IN); Lohitashwa Thyagaraj, Bangalore (IN); Paul Titheridge, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 822 days.

(21) Appl. No.: 12/508,613

(22) Filed: Jul. 24, 2009

(65) Prior Publication Data
US 2011/0022663 A1  Jan. 27, 2011

(51) Int. Cl.
G06F 15/16 (2006.01)
(52) U.S. Cl.
USPC .................. 709/206; 718/1; 719/313
(58) Field of Classification Search
None
See application file for complete search history.

(56) References Cited

U.S. PATENT DOCUMENTS

| 5,856,972 | A  | * | 1/1999 | Riley et al. ................ 709/238 |
| 6,014,700 | A  |   | 1/2000 | Bainbridge et al. |
| 6,381,241 | B1 |   | 4/2002 | Ghirnikar et al. |
| 6,732,149 | B1 | * | 5/2004 | Kephart ................. 709/206 |
| 6,845,391 | B1 | * | 1/2005 | Aas et al. ............... 709/206 |
| 6,883,014 | B1 | * | 4/2005 | McErlean ............... 709/202 |
| 7,080,123 | B2 |   | 7/2006 | Freed |
| 2004/0205770 | A1 | * | 10/2004 | Zhang et al. ............. 719/313 |
| 2005/0210109 | A1 |   | 9/2005 | Brown et al. |
| 2006/0200829 | A1 |   | 9/2006 | Astl et al. |

FOREIGN PATENT DOCUMENTS

| WO | WO 9607283 A1 * | 3/1996 |
| WO | WO 9717813 A1 * | 5/1997 |
| WO | 2007067652 A2 | 6/2007 |

OTHER PUBLICATIONS

NNRD 455145. "Strict Read Order Control for a Queing System." IBM Technical Disclosure Bulletin. Mar. 2002. UK. Issue 455, p. 506. Mar. 1, 2002. 7 pages.*
R. Raghavendra et al., "No 'power' struggles: Coordinate multi-level power management for the data center," ASPLOS'08, Mar. 1-5, 2008.
J. Xu et al., "On the use of fuzzy modeling in virtualized data center management," 4th Int'l Conf. on Autonomic Computing, 2007.

(Continued)

Primary Examiner — Jeffrey R Swearingen
(74) Attorney, Agent, or Firm — Alvin Borromeo

(57) ABSTRACT

A first queue stores messages to be consumed. A second queue temporarily stores completely duplicative messages that have message identifiers equal to message identifiers of messages currently being processed s and that have times equal to times of the messages being processed; processing of the completely duplicative messages never occurs. By comparison, a partially duplicative message has its processing delayed until the message of which it is partially duplicative has been finished being processed. A partially duplicative message has a message identifier equal to a message identifier of a message referenced within the non-persistent store and has a time unequal to a time of the message referenced within the non-persistent store is moved from the first to the second queue. A non-persistent store stores references to the messages currently being processed. Once the messages are finished being processed, the references to them are removed from the non-persistent store.

18 Claims, 4 Drawing Sheets

OTHER PUBLICATIONS

BEAWebLogic Server: "Programming WebLogic Web Services," chapter 10: "Using Reliable SOAP Messaging," version 8.1, revised Jun. 28, 2006.

"High Quality JMS Messaging," http://www.swiftmq.com/products/harouter/advanced/duplicate/index.html, copyright 2000-2009.

B.D. Cunningham, "Message Level Protocol," messagelevel.com, May 2, 2005.

"Microsoft Dynamics CRM Team Blog," blogs.msdn.com, Nov. 18, 2008.

"Clarity switch," www.synergy-fs.com, Nov. 17, 2008.

S. Garlatti et al., "Declarative specifications for adaptive hypermedia based on a semantic web approach," Lecture Notes in Computer Science, in User Modeling 2003, vol. 2702, pp. 81-85, dated 2003.

B. Parvin et al., "Declarative flow control for distributed instrumentation," Lawrence Berkeley National Laboratory, http://www.escholarship.org/uc/item/49p0n7ws, Jun. 1, 2001.

"Programming WebLogic Web Services," Chapter 10 (using reliable soap messaging), version 8.1, docs.oracle.com/cd/E13222_01/wls/docs81/index.html, Jun. 28, 2006.

MQTopicConnectionFactory: Clone Support, WebSphere Application Server Information Center, pic.dhe.ibm.com/infocenter/wasinfo/v6r1/index.jsp?topic=%2Fcom.ibm.websphere.javadoc.doc%2Fconfigdoc%2Fresources.jms.mqseries%2FMQTopicConnectionFactory.html, dated 2005.

K. Yusuf, "Enterprise Messaging Using JMS and IBM WebSphere," ISBN-10: 0131468634, ISBN-13: 978-0131468634 p. 119 (relating to Clone Support), Mar. 6, 2004.

"How a message-driven bean connects in a cluster," WebSphere Application Server Information Center, pic.dhe.ibm.com/infocenter/wasinfo/v7r0/index.jsp?topic=%2Fcom.ibm.websphere.nd.multiplatform.doc%2Finfo%2Fae%2Fae%2Fcjn_mdb_endpt_overview.html, dated 2005.

"Key Integration Concepts," http://download.oracle.com/docs/cd/A87860_01/doc/ois.817/a83729/adois04.htm#1000423, dated 1996.

"Exchanging XML data using advanced queueing (AQ) and Oracle streams," http://docs.oracle.com/cd/B10501_01/appdev.920/a96620/xdb22aq.htm, dated 2002.

"Duplicate message detection," swiftmq.com, dated 2000.

* cited by examiner

PARTIALLY AND COMPLETELY DUPLICATIVE MESSAGES HANDLING

FIELD OF THE INVENTION

Embodiments of the invention relates generally to handling messages, such as determining which messages are to be sent from a queue at a server to clients for processing, and more particularly to handling messages that are partially duplicative to messages currently being processed, as well as handling messages that are completely duplicative to messages currently being processed.

BACKGROUND OF THE INVENTION

In some types of computing environments, a server computing device, or server, sends messages to client computing devices, or clients, for processing of the messages, in response to requests for messages from the clients. For instance, one or more application computer programs referred to as message producers may generate or produce messages that are queued at the server. One or more application programs referred to as message consumers may then consume or process the messages at the client upon the client receiving the messages from the server after the messages have been queued at the server.

SUMMARY OF THE INVENTION

Embodiments of the invention relates to handling messages, such as determining which messages are to be sent from a server to clients for processing. The messages handled include messages that are partially duplicative to messages currently being processed, as well as messages that are completely duplicative to messages currently being processed. In one embodiment of the invention the method repeats the following in response to a request from a client to receive a message from a first queue at a server, until the server has sent a message to the client responsive to the client's request.

The server retrieves a next message from the first queue. The server determines a message identifier and a time of the next message. In response to determining that a given message is referenced within a non-persistent store at the server by a message identifier equal to the message identifier of the next message, temporarily skips the next message if the given message is further referenced within the non-persistent store by a time unequal to the time of the next message. This is because the next message is a partially duplicative message to the message in question referenced within the non-persistent store. As such, this next message is sent to the client in response to a later request from the client to receive a message from the first queue, when this next message is no longer partially duplicative to any message referenced within the non-persistent store.

However, if there is no message that is referenced within the non-persistent store by a message identifier equal to the message identifier of the next message, then the server stores a reference of the next message within the non-persistent store. This is achieved by storing the message identifier and the time of the next message within the non-persistent store. The server then sends the next message to the client, as the message responsive to the client's request, and removes the next message from the first queue.

A computing device, such as a server computing device or server, of an embodiment of the invention includes one or more processors, a first queue, a second queue different than the first queue, a non-volatile memory to store a non-persistent store, and a component that is executed by the processors. The first queue stores messages that have been received from one or more message producers and that are to be consumed by one or more message consumers. The second queue stores completely duplicative messages that have message identifiers equal to message identifiers of messages currently being processed by the message consumers and that have times equal to times of the messages currently being processed by the message consumers. As such, processing of the completely duplicative messages by the message consumers never occurs.

The non-persistent store stores references to the messages currently being processed by the message consumers. Once the messages are finished being processed by the message consumers, the references to the messages are removed from the non-persistent store. The references to the messages are stored within the non-persistent store by their message identifiers and times. The component temporarily skips a given message, such that the given message is not immediately sent for the message consumers to process. The given message has a message identifier equal to a message identifier of one of the messages referenced within the non-persistent store and has a time unequal to a time of this one message. As such, the given message is not processed until the one message has been processed, because the given message is a partially duplicative message to the one of the messages currently being processed by the message consumers.

A computer program product has or stores one or more computer programs that are executable by one or more processors, such as the processors of one or more computing devices. Execution of the computer programs by the processors causes a method to be performed. The method is performed in response to a request from a client wanting to receive a message from a first queue. The method repeats the following until a message has been sent to the client responsive to the client's request. The method retrieves the next message from the first queue, and determines the message identifier and the time of this next message.

In response to determining that a given message is referenced within a non-persistent store by a message identifier equal to the message identifier of the next message, the method temporarily skips the next message as being a partially duplicative message to the message referenced within the non-persistent store, if the given message is further referenced within the non-persistent store by a time unequal to the time of the next message. As such, this next message is sent to the client in response to a later request from the client to receive a message from the first queue, when this message is no longer partially duplicative of any message referenced within the non-persistent store.

If there is no message that is referenced within the non-persistent store by a message identifier equal to the message identifier of the next message, then the method stores a reference of the next message within the non-persistent store. This is achieved by storing the message identifier and the time of the next message within the non-persistent store. The next message is then sent to the client, as the message responsive to the client's request, and is removed from the first queue.

Other aspects and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

Figure 1:
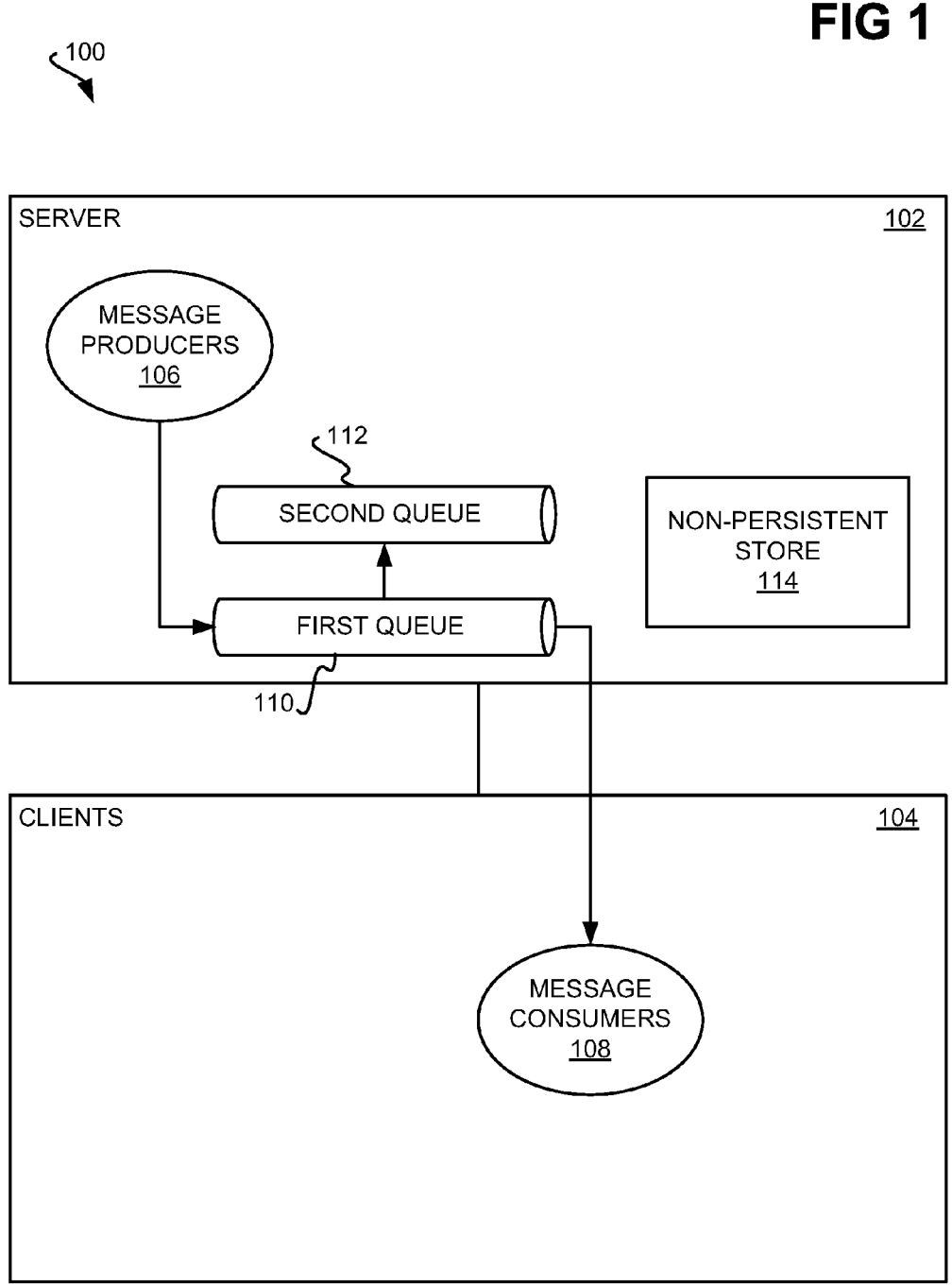
FIG. 1 is a diagram of a computing system, according to an embodiment of the invention.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

PROBLEM STATEMENT AND OVERVIEW OF SOLUTION

As noted in the background section, in some types of computing systems, messages queued at a server computing device, or server, are requested by client computing devices, or clients, so that the clients can receive the messages and process them. A message may have a message identifier, or ID, that is supposed to, to at least some extent, uniquely identify the message as compared to other messages. However, problems can occur if a message has the same message identifier as another message, for whatever reason. The messages may be processed improperly, for instance, or one of the messages may not be processed at all.

Embodiments of the invention ameliorate one or more of the above mentioned problems. Two types of duplicative messages are distinguished from one another. A partially duplicative message has the same message identifier as another message, but has a different time as the other message. The time of a message may be the time at which the message was generated, for instance, or it may be the time at which the message was placed in the queue, among other types of times. Embodiments of the invention delay processing a second message that is partially duplicative to a first message that is currently being processed, until the first message has finished being processed. In this way, the fact that the two messages have the same message identifier does not cause the messages to be improperly processed, since the second message is not processed at the same time that the first message is.

Furthermore, a completely duplicative message has both the same message identifier and the same time as another message. A completely duplicative message is desirably not processed at all, since it is likely to be completely identical to the other message in question, insofar as it has the same message identifier and was generated at the same time (for instance) as the other message. Embodiments of the invention mark a second message that is completely duplicative to a first message that is currently being processed such that the second message may never be processed. The second message may simply be moved from the queue to a different queue, for instance, so that it never is sent to a client for processing.

In the following sections of the detailed description, a system for handling partially and completely duplicative messages is presented, as well as a method for handling partially and completely duplicative messages. Furthermore, a representative server computing device that handles partially and completely duplicative messages is described, and details regarding how embodiments of the present invention can be implemented are provided.

System and Methods

FIG. 1 shows a computing system 100, according to an embodiment of the invention. The computing system includes a server 102 and one or more clients 104. The server 102 is a computing device having one or more processors, volatile memory like semiconductor memory, non-volatile storage devices like hard disk drives, and other types of hardware. Likewise, each of the clients 104 is a computing device having one or more processors, volatile memory like semiconductor memory, non-volatile storage devices like hard disk drives, and other types of hardware. The server 102 is communicatively connected to the clients 104, such as via one or more networks.

The server 102 has one or more message producers 106 running thereon, whereas the clients 104 have one or more message consumers 108 running thereon. Each of the message producers 106 is an application computer program running on the server 102. Likewise, each of the message consumers 108 is an application program running on one or more of the clients 104. The message producers 106 produce or generate messages. The message consumers 108 consume or process these messages.

The server 102 includes a first queue 110, a second queue 112, and a non-persistent store 114. The first queue 110 stores messages that have been received from the message producers 106 and that are to be consumed by the message consumers 108. That is, messages generated by the message producers 106 are initially stored in the first queue 110, and the message consumers 108 receive the messages from the first queue 110. The clients 104 thus request and receive messages from the first queue 110. In response to receiving such requests, the server 102 sends the messages from the first queue 110 to the clients 104.

The second queue 112 is different than the first queue 110 in that it is a separate queue. The second queue 112 stores fully duplicative messages. As noted above, fully duplicative messages have messages identifiers equal to message identifiers currently being processed by the message consumers 108, and also have times equal to the times of the messages currently being processed by the message consumers 108. Once placed in the second queue 112, the fully duplicative messages are never processed by the message consumers 108. Rather, an administrator may periodically review the second queue 112, to determine why such fully duplicative messages are being generated by the message producers 106, which may be as a result of some type of error or bug within the message producers 106.

By comparison, partially duplicative messages just have their processing by the message consumers 108 delayed. As noted above, partially duplicative messages have message identifiers equal to message identifiers currently being processed by the message consumers 108, but have times unequal to the times of the messages currently being processed by the message consumers 108. When a given message is identified within the first queue 110 as being the next message to be sent to the clients 104 for processing by the message consumers 108, the message identifier of this message is compared to the messages identifiers of messages currently being processed by the message consumers 108. If the message identifier of this given message matches the message identifiers of one of the message identifiers currently being processed by the message consumers 108, then the time of the given message is compared to the time of the message that has the matching message identifier. If the times also match, then the given message is considered a fully or completely duplicative message, and the given message is moved to the second queue 112 such that the given message is never sent to or processed by the message consumers 108.

By comparison, if the times do not match, then the given message is a considered a partially duplicative message, and is temporarily skipped, and is not sent next to the clients 104 for processing by the message consumers 108. However, the given message is still at the top of the first queue 110 (i.e., is the oldest message within the queue 110). As such, the next time the clients 104 request a message to be sent from the queue 110, this message will again be examined, to determine whether it still partially matches a message currently being processed by the message consumers 108. At some point, the given message will no longer being partially duplicative—due to the message that the given message partially matches having been finished being processed by the message consumers 108—and will be sent from the first queue 110 to the clients 104.

The non-persistent store 114 does not persist its contents when power is removed from the server 102. For example, the non-persistent store 114 may be implemented via volatile memory, the contents of which are lost when power is removed therefrom. That is, the non-persistent store 114 is not implemented via a persistent storage device, like a hard disk drive, which retains its contents when power is removed therefrom. The non-persistent store 114 thus permits its contents to be quickly read from and written to, insofar as non-persistent storage like volatile memory is typically faster than persistent storage like hard disk drives and even persistent memory such as flash memory.

The non-persistent store 114 stores references to the messages currently being processed by the message consumers 108. The messages being currently processed by the message consumers 108 are those that have already been sent by the server 102, from the first queue 110, to the clients 104. Specifically, for each such message, the message identifier of the message and the time of the message are stored. The non-persistent store 114 may store such references by way of a vector or a hash, as can be appreciated by those of ordinary skill within the art. Once the messages referenced within the non-persistent store 114 have finished being processed by the message consumers 108, the references to these messages are removed from the non-persistent store 114.

It is noted that whereas the first queue 110 and the second queue 112 actually store messages, the non-persistent store 114 does not store messages themselves, but rather stores references to messages. There is a difference. For example, a message may have one or more parameters, such as a message identifier and a time, among other types of parameters, and may also have data, which is the actual content of the message. The first queue 110 and the second queue 112 thus store a message in its entirety, including all of its parameters and its contents or data. By comparison, the non-persistent store 114 stores a reference to the message, in that it just stores some (or all) of the parameters of the message, such as its message identifier and time, and does not store the message's content or data.

Figure 2:
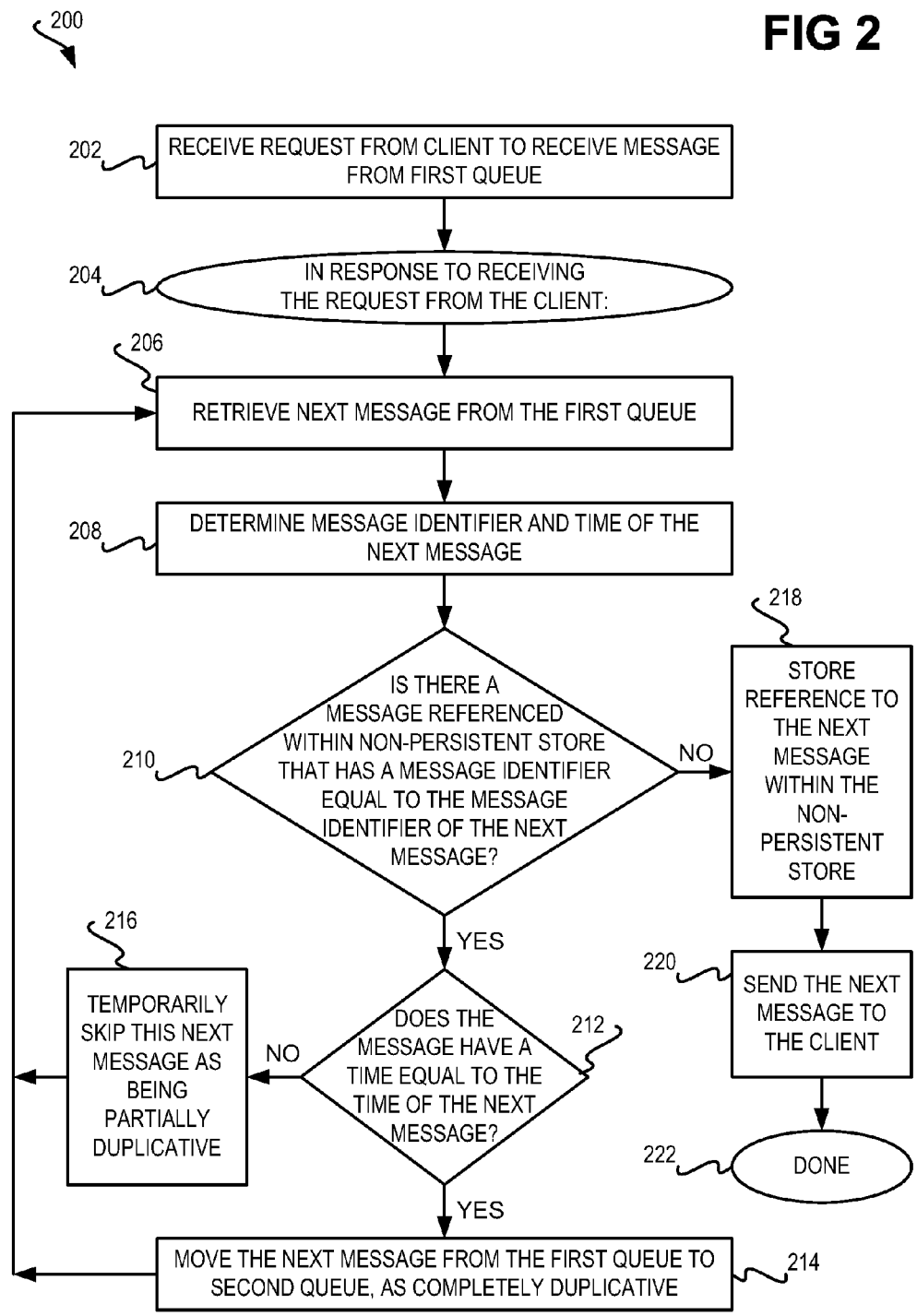
FIGS. 2 and 3 are flowcharts of methods for handling partially duplicative messages and completely duplicative messages, according to varying embodiments of the invention.
Figure 3:
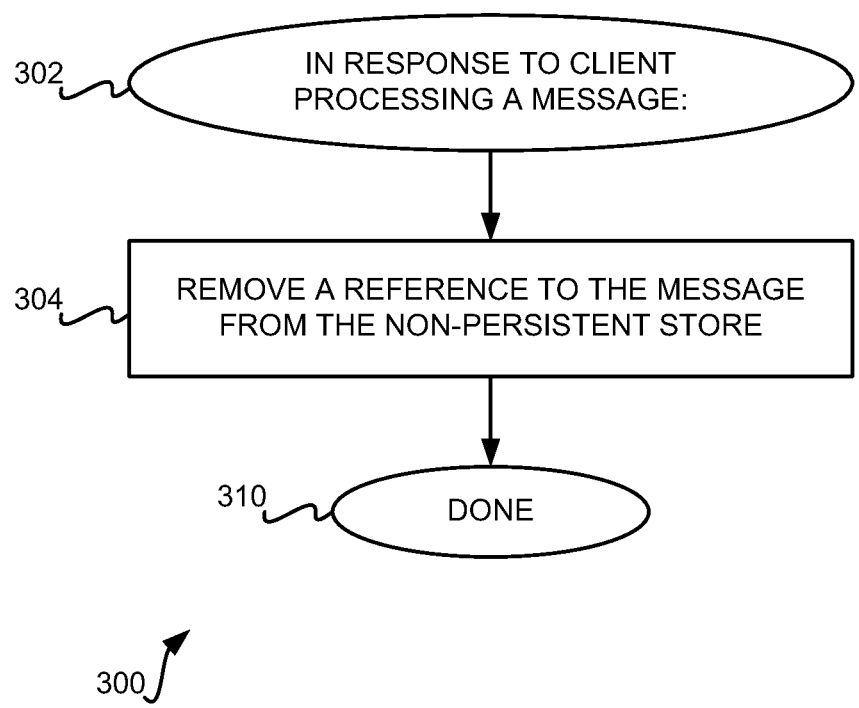

FIGS. 2 and 3 show methods 200 and 300, respectively, which depict how messages are handled by the server 102 within FIG. 1, according to embodiments of the invention. In FIG. 2, the server 102 receives a request from one of the clients 104 for the client to receive a message from the first queue 110 at the server 102 (202). In response to receiving this request, the server 102 performs the following (204). The server 102 retrieves the next message from the first queue 110 (206). For example, the first queue 110 may be a first-in, first-out (FIFO) queue, in which the oldest message in the queue 110 is the next message to be retrieved from the queue 110, and the newest message in the queue 110 is the last message to be retrieved from the queue 110.

The server 102 determines the message identifier and the time of this next message (208). The server 102 further determines if there is a message referenced within the non-persistent store 114 that has a message identifier equal to the message identifier of the next message (210). If so, the server 102 also determines if this message referenced within the non-persistent store 114 has a time equal to the time of the next message (212). If so, then this means that the next message that has been retrieved is completely identical to the message in question referenced within the non-persistent store 114. As such, the next message is completely duplicative of the message in question, and therefore is moved from the first queue 110 to the second 112 (214). That is, a completely duplicative message will never be processed, because it is completely duplicative to a message referenced within the non-persistent store 114 and that is currently being processed by one of the message consumers 108. The method 200 is then repeated at part 206, where a new next message is retrieved from the first queue 110 and is handled.

However, if there is a message referenced within the non-persistent store 114 that has a message identifier equal to the message identifier of the next message (210), but if this message referenced within the non-persistent store 114 does not have a time equal to the time of the next message (212), then this means that the next message is partially identical to the message in question referenced within the non-persistent store 114. To ensure that this next message is not sent to the client and processed by one of the message consumers 108, the server 102 temporarily skips this next message within the first queue 110 (216), and may mark this next message as being partially duplicative. The method 200 is then repeated at part 206, where a new next message is retrieved from the first queue 110 (i.e., the message that may be located immediately after the partially duplicative message in the first queue 110) and is handled.

It is noted, therefore, that part 206 is performed in one of three different situations. First, part 206 is performed after a request is received from a client in part 202, in response to receiving this request in part 204. In this instance, part 206 retrieves the next message from the first queue 110, which in at least some embodiments is the message at the top of the queue 110 (i.e., the oldest message within the queue 110). It is noted that the next message in this case may be a message that was previously considered or marked as being partially duplicative as a message currently being processed by the message consumers 108. However, such a given message is nevertheless retrieved, because this given message may no longer be partially duplicative, since the message that the given message is partially duplicative of may have finished having been processed by the message consumers 108—such that the given message is no longer partially duplicative of any message currently being processed by the consumers 108.

Second, part 206 is performed after a given message is moved from the first queue 110 to the second queue 112 in part 214, due to the given message being completely duplicative of a message currently being processed by the message consumers 108. In this instance, part 206 also retrieves the message at the top of the first queue 110 (i.e., the oldest message within the queue 110). This is because the message that was previously at the top of the first queue 110 (i.e., which was previously the oldest message within the queue 110) has been moved from the first queue 110 to the second queue 112, and therefore is no longer at the top of the queue 110, and thus is no longer the oldest message within the queue 110.

Third, part 206 is performed after a given message has been detected as being partially duplicative of a message currently being processed by the message consumers 108, in part 216. In this instance, part 206 does not retrieve the message at the top of the first queue 110 (i.e., the oldest message within the queue 110), because that message is the message that has just been detected as being partially duplicative of a message currently being processed by the message consumers 108. Rather, part 206 in this instance retrieves the next message in the first queue 110, which in this case is the message within the queue 110 that is located after the message that has just been detected as being partially duplicative.

Furthermore, if there is no message referenced within the non-persistent store 114 that has a message identifier equal to the message identifier of the next message (210), then the server 102 stores a reference to this next message within the non-persistent store 114 (218), and sends this next message to the client for processing by one of the message consumers 108 (220). The server 104 specifically stores the message identifier and the time of the next message within the non-persistent store 114. By sending the next message to the client, one of the message consumers 108 will immediately begin processing this next message, such that the non-persistent store 114 stores references to messages currently that are being processed by the message consumers 108, as noted above. The method 200 is thus finished (222).

It is noted that in effect, the method 200 of FIG. 2 repeats parts 206, 208, 210, 212, 214, 216, 218, and/or 220 until a message has been sent by the server 102 to the client responsive to the client's request for a message from the first queue 110. That is, messages are retrieved one by one and handled by the server 102 via parts 206, 208, 210, 212, 214, 216, 218, and/or 220, until one of these messages is ultimately sent to the client in part 220. At that time, the message 222 is finished. If a given message is not sent to the client in part 220, it is marked as being completely duplicative and is moved from the first queue 110 to the second queue 112 in part 214, or is partially duplicative and is temporarily skipped in part 216. From either part 214 or part 216, however, the method 220 repeats back at part 206.

Referring next to FIG. 3, the method 300 is performed each time one of the clients 104 has reported back to the server 102 that processing of a given message by one of the message consumers 108 has finished. The server 102 performs the following in response to one of the clients 104 (i.e., one of the message consumers 108 being executed by this client) having finished processing a message (302). In particular, the reference to the given message is removed from the non-persistent store 114 (304). More specifically, the message identifier of and the time of this given message are removed from the non-persistent store 114. The method 300 is then finished (310).

Representative Server and Implementation Details

Figure 4:
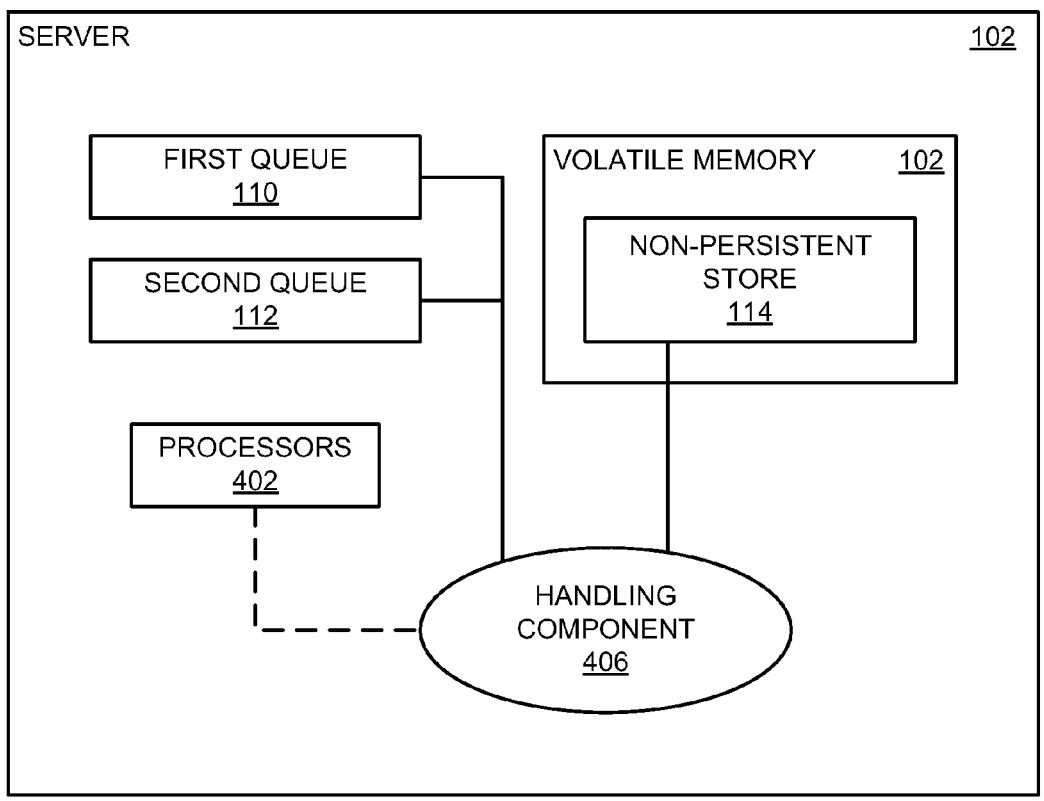
FIG. 4 is a diagram of a representative server computing device, according to an embodiment of the invention.

FIG. 4 shows an exemplary embodiment of the server 102. The server 102 is depicted as including the following hardware: one or more processors 402 and volatile memory 404. However, the server 102 may include other hardware, in addition to the processors 402 and the volatile memory 404. For example, the server 102 may include non-volatile storage devices, such as hard disk drives, as well as other types of hardware, as can be appreciated by those of ordinary skill within the art.

The server 102 includes the first queue 110, the second queue 112, and the non-persistent store 114 that have been described. The manner by which the queues 110 and 112 are implemented is not limited by the invention. For example, the queues 110 and 112 may be implemented via the volatile memory 404, by non-volatile storage devices, or in another manner. By comparison, the non-persistent store 114 is implemented in the volatile memory 404, which may be semiconductor memory.

The server 102 further includes a handling component 406. The handling component 406 may be implemented as one or more computer programs, which may be stored on the volatile memory 404 and/or on a non-volatile storage device, and which are executed by the processors 402. As such, it is said that the handling component 406 is executed by the processors 402. The handling component 406 performs the functionality ascribed to the server 102 in the methods 200 and 300 of FIGS. 2 and 3.

For example, the handling component 406 moves a given message from the first queue 110 to the second queue 112, where the given message has a message identifier equal to the message identifier of a message referenced within the non-persistent store 114, and has a time equal to the time of this message referenced within the store 114. As such, the given message is completely duplicative of the message referenced within the non-persistent store 114.

Furthermore, the handling component 406 also adds a reference to a selected message to the non-persistent store 114 when the component 406 sends the selected message to a client for processing, responsive to a request from the client. The reference includes the message identifier and the time of the selected message, as has been described. Once the selected message has been processed, the handling component 406 removes the reference to the selected message from the non-persistent store 114.

Additionally, the handling component 406 skips a given message within the first queue 110 that has both a message identifier and a time unequal to the message identifier and the time of a message within the non-persistent store 114. Such a given message is skipped because it is partially duplicative to the message in question referenced within the non-persistent store 114. The given message is later examined when a new request is received from the client for a message from the first queue 110. At that time, the given message may no longer be partially duplicative, since the message in question to which the given message was partially duplicative may have been completely processed, and no longer reference within the non-persistent store 104.

As can be appreciated by one those of ordinary skill within the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects and embodiments of the invention have been described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A method for message handling, the method comprising, in response to a request from a client to receive a message from a first queue at a server, repeating:

retrieving by the server a next message from the first queue;

determining by the server a message identifier and a time of the next message;

in response to determining that a message is referenced within a non-persistent store at the server by a message identifier equal to the message identifier of the next message, and in response to determining that the message is further referenced within the non-persistent store by a time unequal to the time of the next message, temporarily skipping the next message as being a partially duplicative message to the message referenced within the non-persistent store, such that the next message is sent to the client in response to a later request from the client to receive a message from the first queue when the next message is no longer a partially duplicative message to any message referenced within the non-persistent store;

in response to determining that no message is referenced within the non-persistent store by a message identifier equal to the message identifier of the next message, storing a reference of the next message within the non-persistent store by storing the message identifier and the time of the next message within the non-persistent store; and, sending from the server to the client the next message as the message responsive to the request from the client, and removing the next message from the first queue, until the server has sent the next message to the client responsive to the request from the client.

2. The method of claim 1, further comprising, in response to the client processing the message received by the client responsive to the request from the client, removing the reference to the message processed by the client from the non-persistent storage by removing the message identifier and the time of the message processed by the client from the non-persistent storage.

3. The method of claim 1, wherein the non-persistent store is to store references to messages that are currently being processed, such that once the messages have finished being processed, the references to the messages are removed from the non-persistent store.

4. The method of claim 1, wherein the first queue is to store messages at the server that have been received by the server from one or more message producers and that are to be consumed by one or more message consumers.

5. The method of claim 1, wherein processing of the partially duplicative message is delayed until the message reference within the non-persistent store is finished being processed by the message consumers.

6. The method of claim 1, further comprising, in response to determining that a message is referenced within the non-persistent store of messages by a message identifier equal to the message identifier of the next message, and in response to determining that the message is referenced within the non-persistent store by a time equal to the time of the next message, moving the next message from the first queue to a second queue, the next message being completely duplicative to the message referenced within the non-persistent store, such that the next message is never sent to the client.

7. The method of claim 6, wherein the second queue is to store completely duplicative messages that have message identifiers equal to message identifiers of messages currently being processed by one or more message consumers and that have times equal to times of the messages currently being processed by the message consumers, such that the completely duplicative messages are never processed by the message consumers.

8. The method of claim 1, further comprising, after determining by the server the message identifier and the time of the next message, determining by the server whether a message is referenced within the non-persistent store of messages by a message identifier equal to the message identifier of the next message.

9. The method of claim 1, further comprising, in response to determining that a message is referenced within the non-persistent store of messages by a message identifier equal to the message identifier of the next message, determining by the server whether the message is referenced within the non-persistent store by a time equal to the time of the next message.

10. A computing device comprising:

one or more processors;

a first queue to store messages that have been received from one or more message producers and that are to be consumed by one or more message consumers;

a second queue different than the first queue, to store completely duplicative messages that have message identifiers equal to message identifiers of messages currently being processed by the message consumers and that have times equal to times of the messages currently being processed by the message consumers, such that processing of the completely duplicative messages by the message consumers never occurs;

a volatile memory to store a non-persistent store to store references to the messages currently being processed by the message consumers, such that once the messages are finished being processed by the message consumers, the references to the messages are removed from the non-persistent store, where the references to the messages are stored within the non-persistent store by the message identifiers and the times of the messages; and, a component executed by the processors to temporarily skip a given message, such that the given message is not immediately sent for the message consumers to process, the given message having a message identifier equal to a message identifier of one of the messages referenced within the non-persistent store and having a time unequal to a time of the one of the messages, such that the given message is not processed by the message consumers until the one of the messages has been processed by the message consumers, due to the given message being a partially duplicative message to the one of the messages currently being processed by the message consumers.

11. The computing device of claim 10, wherein the component is to add a reference to a selected message to the non-persistent store when sending the selected message to a client responsive to a request from a client to receive a message from the first queue.

12. The computing device of claim 10, wherein the component is to remove a reference to a selected message from the non-persistent store upon the selected message being processed by the message consumers.

13. The computing device of claim 10, wherein the component is to move a selected message within the first queue that has both a message identifier and a time equal to the message identifier and the time of a second one of the messages referenced within the non-persistent store to the second queue, due to the selected message being completely duplicative to the second one of the messages referenced within the non-persistent store, such that the selected message will never be processed because the selected message is completely duplicative to the second one of the messages referenced within the non-persistent store.

14. A storage device having one or more computer programs executable by one or more processors, such that execution of the computer programs by the processors causes a method to be performed, the method performed in response to a request from a client to receive a message from a first queue, and comprising:

retrieving a next message from the first queue;

determining a message identifier and a time of the next message;

in response to determining that a message is referenced within a non-persistent store by a message identifier equal to the message identifier of the next message, and in response to determining that the message is further referenced within the non-persistent store by a time unequal to the time of the next message, temporarily skipping the next message as being a partially duplicative message to the message referenced within the non-persistent store, such that the next message is sent to the client in response to a later request from the client to receive a message from the first queue when the next message is no longer a partially duplicative message to any message referenced within the non-persistent store;

in response to determining that no message is referenced within the non-persistent store by a message identifier equal to the message identifier of the next message, storing a reference of the next message within the non-persistent store by storing the message identifier and the time of the next message within the non-persistent store; and, sending the next message as the message responsive to the request from the client, and removing the next message from the first queue, until the next message has been sent to the client responsive to the request from the client.

15. The storage device of claim 14, wherein the method further comprises, in response to the client processing the message received by the client responsive to the request from the client, removing the reference to the message processed by the client from the non-persistent storage by removing the message identifier and the time of the message processed by the client from the non-persistent storage.

16. The storage device of claim 14, wherein the method further comprises, in response to determining that a message is referenced within the non-persistent store of messages by a message identifier equal to the message identifier of the next message, and in response to determining that the message is referenced within the non-persistent store by a time equal to the time of the next message, moving the next message from the first queue to a second queue, the next message being completely duplicative to the message referenced within the non-persistent store, such that the next message is never sent to the client.

17. The storage device of claim 16, wherein the second queue is to store completely duplicative messages that have message identifiers equal to message identifiers of messages currently being processed by one or more message consumers and that have times equal to times of the messages currently being processed by the message consumers, such that the completely duplicative messages are never processed by the message consumers.

18. The storage device of claim 14, wherein processing of the partially duplicative message is delayed until the message reference within the non-persistent store is finished being processed by the message consumers.

\* \* \* \* \*